United States Patent
Wei et al.

(10) Patent No.: US 11,637,603 B2
(45) Date of Patent: Apr. 25, 2023

(54) CSI FEEDBACK OVERHEAD REDUCTION FOR FD-MIMO

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/941,287

(22) Filed: Jul. 28, 2020

(65) Prior Publication Data
US 2020/0358507 A1    Nov. 12, 2020

Related U.S. Application Data

(62) Division of application No. 15/544,370, filed as application No. PCT/CN2015/070985 on Jan. 19, 2015, now Pat. No. 10,735,070.

(51) Int. Cl.
| | |
|---|---|
| *H04B 7/06* | (2006.01) |
| *H04B 7/0456* | (2017.01) |
| *H04L 5/00* | (2006.01) |
| *H04W 72/04* | (2023.01) |
| *H04W 88/02* | (2009.01) |

(52) U.S. Cl.
CPC ......... *H04B 7/0626* (2013.01); *H04B 7/0469* (2013.01); *H04B 7/0478* (2013.01);
(Continued)

(58) Field of Classification Search
CPC .. H04B 7/0469; H04B 7/0478; H04B 7/0486; H04B 7/0626; H04L 5/0053; H04W 72/042; H04W 88/02
See application file for complete search history.

(56) References Cited

U.S. PATENT DOCUMENTS

| | | |
|---|---|---|
| 2012/0063500 A1 | 3/2012 | Wang et al. |
| 2012/0188976 A1 | 7/2012 | Kim et al. |
| (Continued) | | |

FOREIGN PATENT DOCUMENTS

| | | |
|---|---|---|
| CN | 101867447 A | 10/2010 |
| CN | 102468933 A | 5/2012 |
| (Continued) | | |

OTHER PUBLICATIONS

3GPP: "Study on Elevation Beamfoming/Full-Dimension (FD) MIMO for LTE", 3GPP TR 36.897 V0.1.1, Release 13, Nov. 30, 2014 (Nov. 30, 2014).
(Continued)

*Primary Examiner* — Zhensheng Zhang
(74) *Attorney, Agent, or Firm* — Danai Nelisile Mhembere; Norton Rose Fulbright LLP

(57) ABSTRACT

Mechanisms for reduction of channel state information (CSI) feedback overhead are disclosed for full dimensional multiple input, multiple output (FD-MIMO) systems with large dimension antenna ports. In one aspect, rank-dependent CSI antenna port measurements are used in order to limit the number of antenna ports for high rank CSI reporting. Another aspect allows a user equipment (UE) to select subband feedback for aperiodic CSI porting on an uplink shared channel when the UE is to report subband quality and precoding indicators. Another aspect provides for on-demand CSI feedback that dynamically configures CSI feedback parameters. To reduce the signaling overhead, the multiple parameter sets may be pre-configured with different values for dynamic reporting parameters.

18 Claims, 11 Drawing Sheets

(52) U.S. Cl.
CPC ......... *H04B 7/0486* (2013.01); *H04L 5/0053* (2013.01); *H04W 72/042* (2013.01); *H04W 88/02* (2013.01)

(56) References Cited

U.S. PATENT DOCUMENTS

| | | |
|---|---|---|
| 2013/0028225 A1 | 1/2013 | Ko et al. |
| 2013/0064128 A1 | 3/2013 | Li et al. |
| 2013/0148515 A1 | 6/2013 | Ribeiro et al. |
| 2013/0182789 A1* | 7/2013 | Ko .................... H04B 7/0626 375/267 |
| 2013/0301575 A1 | 11/2013 | Wang et al. |
| 2014/0016549 A1 | 1/2014 | Novlan et al. |
| 2014/0079146 A1 | 3/2014 | Kim et al. |
| 2016/0020843 A1 | 1/2016 | Li et al. |
| 2017/0353222 A1 | 12/2017 | Wei et al. |

FOREIGN PATENT DOCUMENTS

| | | |
|---|---|---|
| CN | 104205660 A | 12/2014 |
| CN | 104221318 A | 12/2014 |
| CN | 104272606 A | 1/2015 |
| WO | WO-2012094821 A1 | 7/2012 |
| WO | WO-2014039056 A1 | 3/2014 |
| WO | WO-2014198068 A1 | 12/2014 |

OTHER PUBLICATIONS

3GPP TS 36.213: "LTE; Evolved Universal Terrestrial Radio Access (E-UTRA); Physical Layer Procedures", Technical Specification, European Telecommunications Standards Institute (ETSI), 650, Route Des Lucioles, F-06921 Sophia-Antipolis Cedex, France, Version 12.3.0, Release 12, Oct. 31, 2014 (Oct. 31, 2014), 214 Pages, Section 7.2.

European Search Report—EP18208027—Search Authority—Munich—dated May 15, 2019.

International Search Report and Written Opinion—PCT/CN2015/070985—ISA/EPO—dated Oct. 28, 2015.

Partial European Search Report—EP18208027—Search Authority—Munich—dated Jan. 24, 2019.

Supplementary European Search Report—EP15878332—Search Authority—Munich—dated Nov. 26, 2018.

* cited by examiner

US 11,637,603 B2

CSI FEEDBACK OVERHEAD REDUCTION FOR FD-MIMO

CROSS-REFERENCE TO RELATED APPLICATIONS

This application is a divisional of U.S. patent application Ser. No. 15/544,370, entitled, "CSI FEEDBACK OVERHEAD REDUCTION FOR FD-MIMO," filing date of Jul. 18, 2017, which is a 371 of PCT Patent Application No. PCT/CN2015/070985, entitled, "CSI FEEDBACK OVERHEAD REDUCTION FOR FD-MIMO WITH LARGE ANTENNA PORTS," filed Jan. 19, 2015, both of which are expressly incorporated by reference herein in their entirety.

BACKGROUND

Field

Aspects of the present disclosure relate generally to wireless communication systems, and more particularly, to channel state information (CSI) feedback overhead reduction for full-dimensional multiple-input, multiple-output (MIMO) systems.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance communication technologies not only to meet the growing demand for mobile broadband access, but to advance and enhance the user experience with mobile communications.

SUMMARY

In one aspect of the disclosure, a method of wireless communication includes receiving, at a UE, an indication to report channel quality and precoding feedback for a plurality of channel state information reference signal (CSI-RS) ports in a full dimensional multiple input, multiple output (FD-MIMO) downlink transmission, transmitting, by the UE, a first channel quality and precoding feedback for each of the plurality of CSI-RS ports, wherein the first channel quality and precoding feedback includes a low rank indicator, selecting, by the UE, a second set of CSI-RS ports of the plurality of CSI-RS ports for a second channel quality and precoding feedback, wherein the selecting the second set of CSI-RS ports is based on a rank indicator associated with the second channel quality and precoding feedback, and transmitting, by the UE, a second channel quality and precoding feedback for each of a second set of CSI-RS ports of the plurality of CSI-RS ports.

In one aspect of the disclosure, a method of wireless communication includes receiving, at a UE, an indication to report the subband channel quality and precoding feedback for a plurality of subbands over a carrier bandwidth, selecting, by the UE, a subset of the plurality of subbands for reporting the subband channel quality and precoding feedback, transmitting, by the UE, the subband channel quality and precoding feedback for each of the subbands in the subset, and transmitting, by the UE, a subband selection indicator to indicate the location of the subset of the plurality of subbands.

In one aspect of the disclosure, a method of wireless communication includes receiving, at a UE, an indication to report aperiodic CSI feedback on an uplink shared channel in a FD-MIMO downlink transmission, wherein the indication includes a feedback parameter code, looking up, at the UE, a list of feedback parameters associated with the feedback parameter code, and generating, by the UE, an aperiodic CSI feedback report using each of the list of feedback parameters.

In one aspect of the disclosure, an apparatus configured for wireless communication includes means for receiving, at a UE, an indication to report channel quality and precoding feedback for a plurality of CSI-RS ports in a FD-MIMO downlink transmission, means for transmitting, by the UE, a first channel quality and precoding feedback for each of the plurality of CSI-RS ports, wherein the first channel quality and precoding feedback includes a low rank indicator, means for selecting, by the UE, a second set of CSI-RS ports of the plurality of CSI-RS ports for a second channel quality and precoding feedback, wherein the means for selecting the second set of CSI-RS ports is based on a rank indicator associated with the second channel quality and precoding feedback, and means for transmitting, by the UE, a second channel quality and precoding feedback for each of a second set of CSI-RS ports of the plurality of CSI-RS ports.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
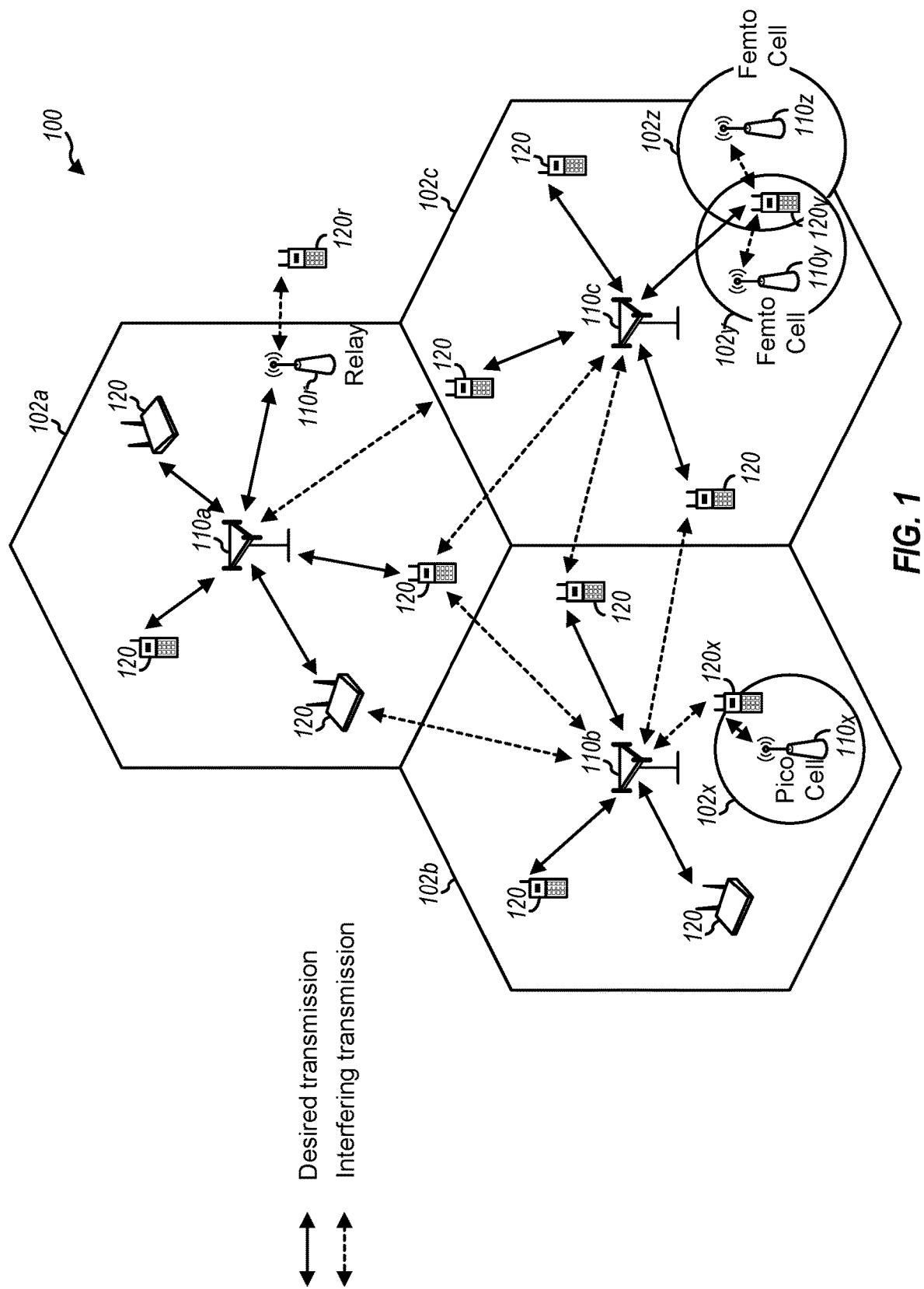
FIG. 1 is a block diagram illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a smart phone, a tablet, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
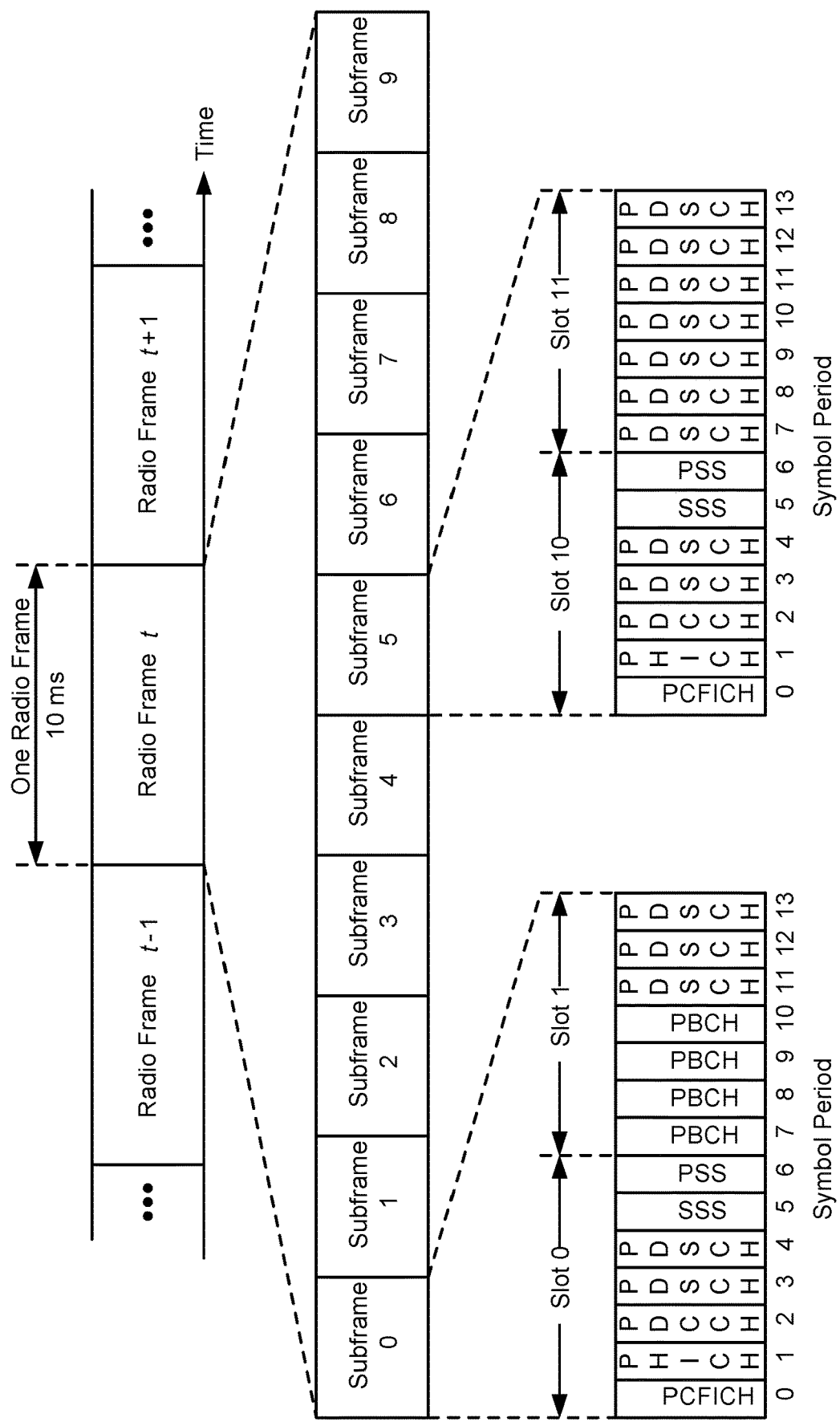
FIG. 2 is a block diagram illustrating an example of a down link frame structure in a telecommunications system.
Figure 6:
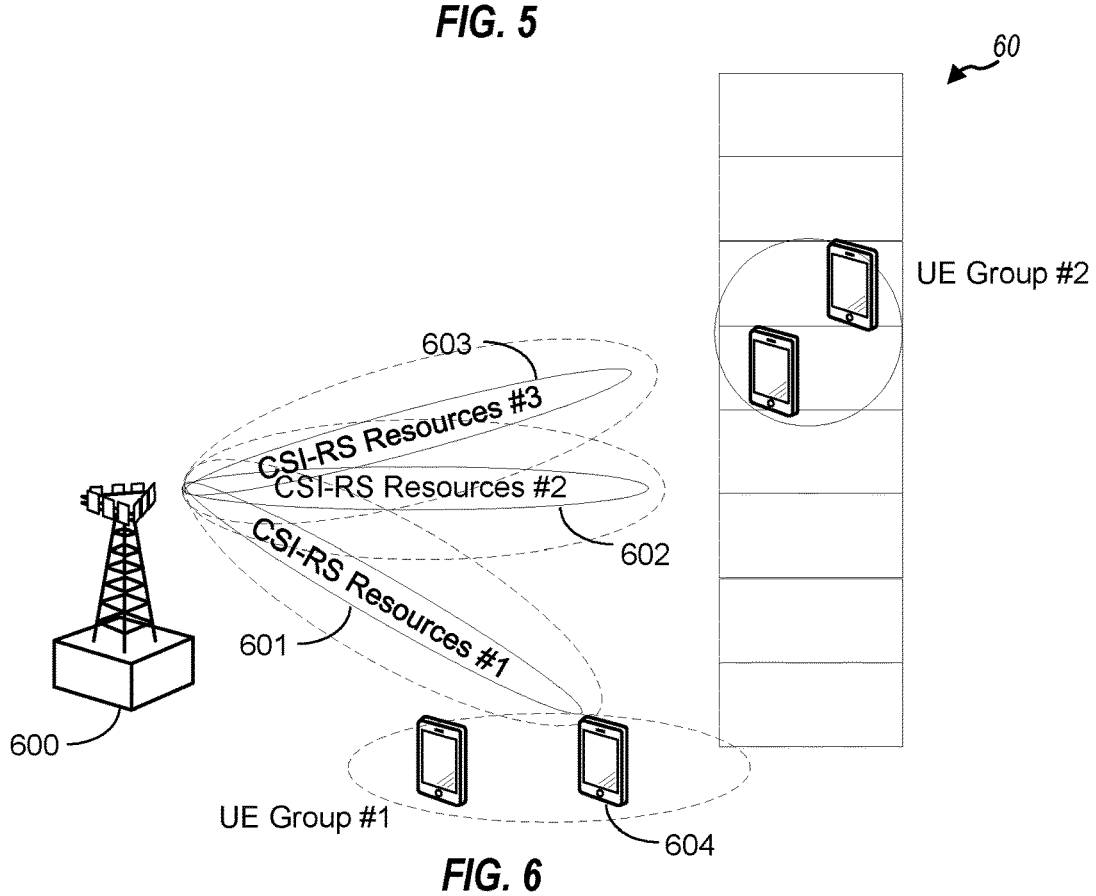
FIG. 6 is a block diagram illustrating a base station transmitting precoded CSI-RS.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
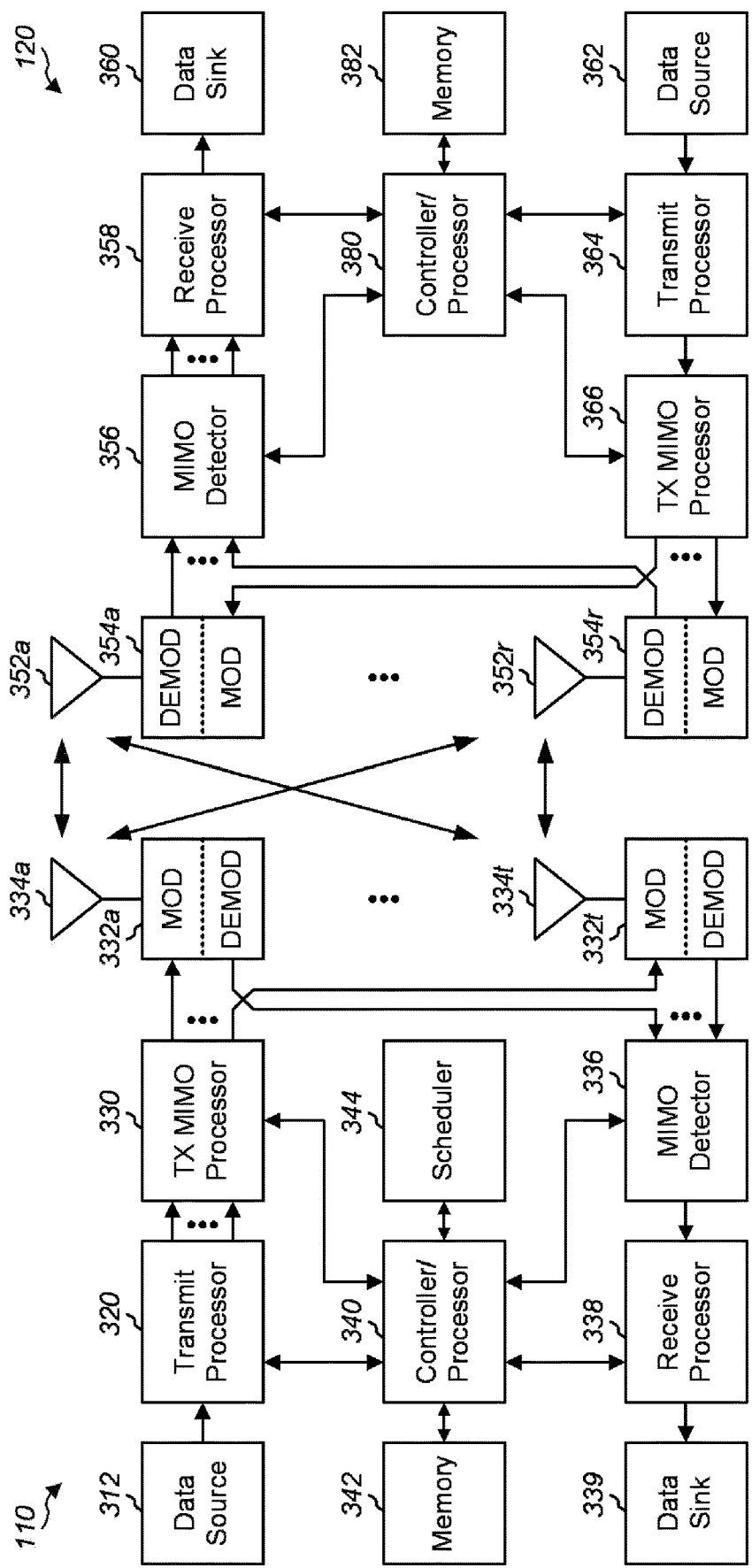
FIG. 3 is a block diagram illustrating a design of a base station and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 7, 9, and 11, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Thus, FD-MIMO technologies may take advantage of both azimuth and elevation beamforming, which would greatly improve MIMO system capacity.

Figure 4:
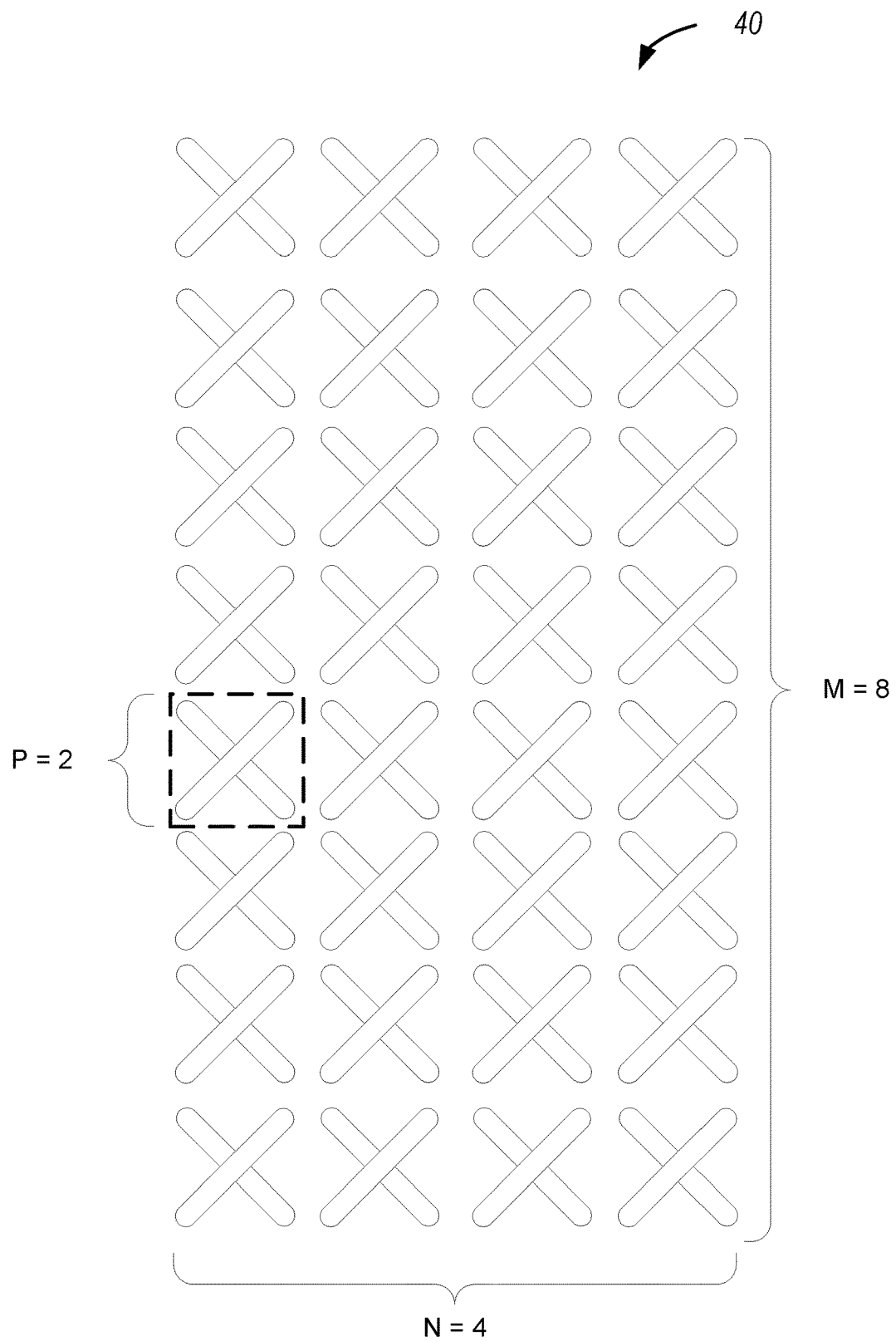
FIG. 4 is block diagram of an exemplary two-dimensional active antenna array.

FIG. 4 is a block diagram illustrating a typical 2D active antenna array 40. Active antenna array 40 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 40 has four columns (N=4), with eight vertical (M=8) cross-polarized antenna elements (P=2).

For a 2D array structure, in order to exploit the vertical dimension by elevation beamforming the channel state information (CSI) is needed at the base station. The CSI, in terms of precoding matrix indicator (PMI) rank indicator (RI) and channel quality indicator (CQI), can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 5:
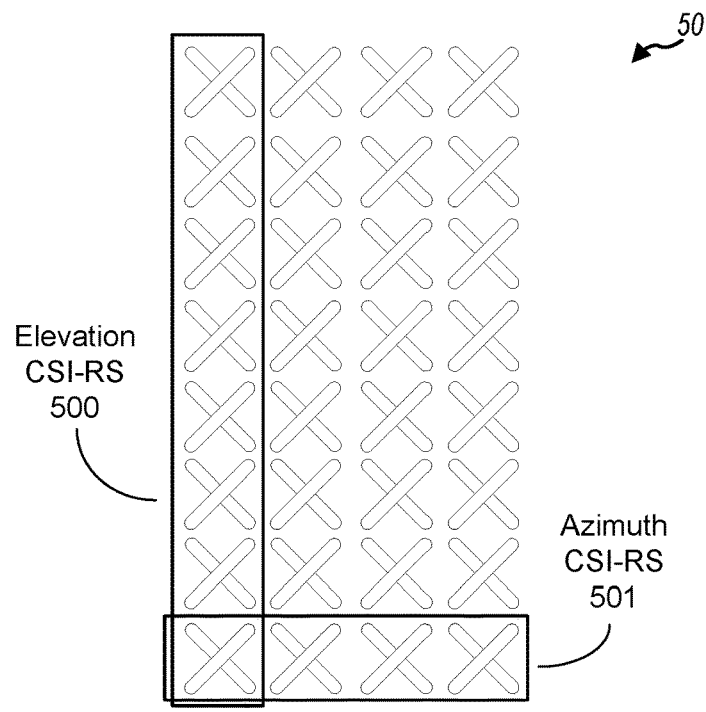
FIG. 5 is a block diagram illustrating a two CSI process configuration each with one dimensional CSI-RS ports for the dimensional CSI feedback.

Solutions for FD-MIMO CSI feedback mechanisms have been proposed for FD-MIMO with a large scale two-dimensional antenna array. For example, dimensional CSI feedback provides for a UE to be configured with two CSI processes each with a 1D CSI-RS port structure either on elevation or azimuth direction. FIG. 5 is a block diagram illustrating a two CSI processes configuration each with one dimensional CSI-RS ports for the dimensional CSI feedback. In dimensional CSI feedback, CSI processes will be defined for both elevation CSI-RS ports 500 and azimuth CSI-RS ports 501. The CSI feedback for each configured CSI process will reflect only a one dimensional channel state information. For example, one CSI feedback will only reflect the CSI of elevation CSI-RS ports 500. The serving eNB (not shown) may then determine a correlation between the two separate CSI processes to obtain an estimated full antenna array precoding. For example, the eNB may use the Kronecker product to combine two precoding vectors for the full antenna array precoding.

Another example CSI feedback mechanism employs a precoded CSI-RS with beam selection. FIG. 6 is a block diagram illustrating a base station 600 configured to transmit precoded CSI-RS for CSI feedback. The UEs in UE groups #1 and #2 are positioned at various elevations in relation to base station 600. In a precoded CSI-RS with beam selection, CSI-RS virtualization may be used to compress a large number of antenna ports into a fewer number of precoded CSI-RS ports. The CSI-RS ports with the same virtualization or elevation beamforming may be associated with one CSI process. For example, the CSI-RS Resource #1 may include CSI-RS ports with the same virtualization or elevation beamforming and would be associated with a first CSI process, while CSI-RS Resource #2 and #3 would also be associated with a different CSI process. A UE can be configured with one or multiple CSI processes for CSI feedback, each with different CSI-RS virtualization. In one example, UE 604 of UE group #1 would be configured for three CSI processes to provide measurement information on CSI-RS Resources #1, #2, and #3, respectively. The serving eNB, base station 600, would determine the best serving CSI-RS beam for UE 604 based on reported CSI feedback.

Several problems and challenges exist with the different current solutions for FD-MIMO CSI feedback. The current solutions each only supply a subset of the CSI information of the full dimensional channel in order to reduce the processing complexity and feedback overhead for the UE. However, with only a portion of the CSI information for the full channel, the base station will not have the best data or information in order to maximize communication performance. In order to get the best data to maximize performance, full dimensional CSI feedback with 2D PMIs, where CSI is measured from 2-dimensional CSI-RS ports with joint selection of azimuth and elevation PMIs would be ideal. A full dimensional CSI-RS resource configuration would include more than 8 CSI-RS ports which are on both horizontal and vertical directions. A joint selection of azimuth and elevation PMIs would performed by a UE based on full channel measurement. In this type of full dimensional feedback, no Kronecker approximation would be needed for CSI reporting. However, such full dimensional CSI feedback uses a large amount of uplink feedback overhead in order to deal with the large number of antenna ports.

Currently, for periodic CSI on PUCCH, the maximum CSI payload size is 11 bits. For CSI on PUSCH, the payload size can be larger, but it is still limited to the assigned uplink bandwidth. The CSI payload may also be determined based on the CSI reporting mode, which is configured through RRC signaling. For example, PUSCH mode 3-2 provides for the UE to report both subband CQI and subband PMI with larger feedback overhead than other CSI modes. For FD-MIMO, the optimization on the elevation beamforming design may depend on multiple factors, such as channel condition, available uplink bandwidth, single user/multiple user operation, and the like. In an example of use with cell edge users, higher spatial resolution is used in order to maximize the signal strength for entities at the cell edge. In other words, a UE is not required to provide accurate full dimensional CSI feedback at all times. Aspects of the present disclosure may provide for both the UE and the eNB to have the flexibility to control full CSI feedback granularity and accuracy.

Figure 7:
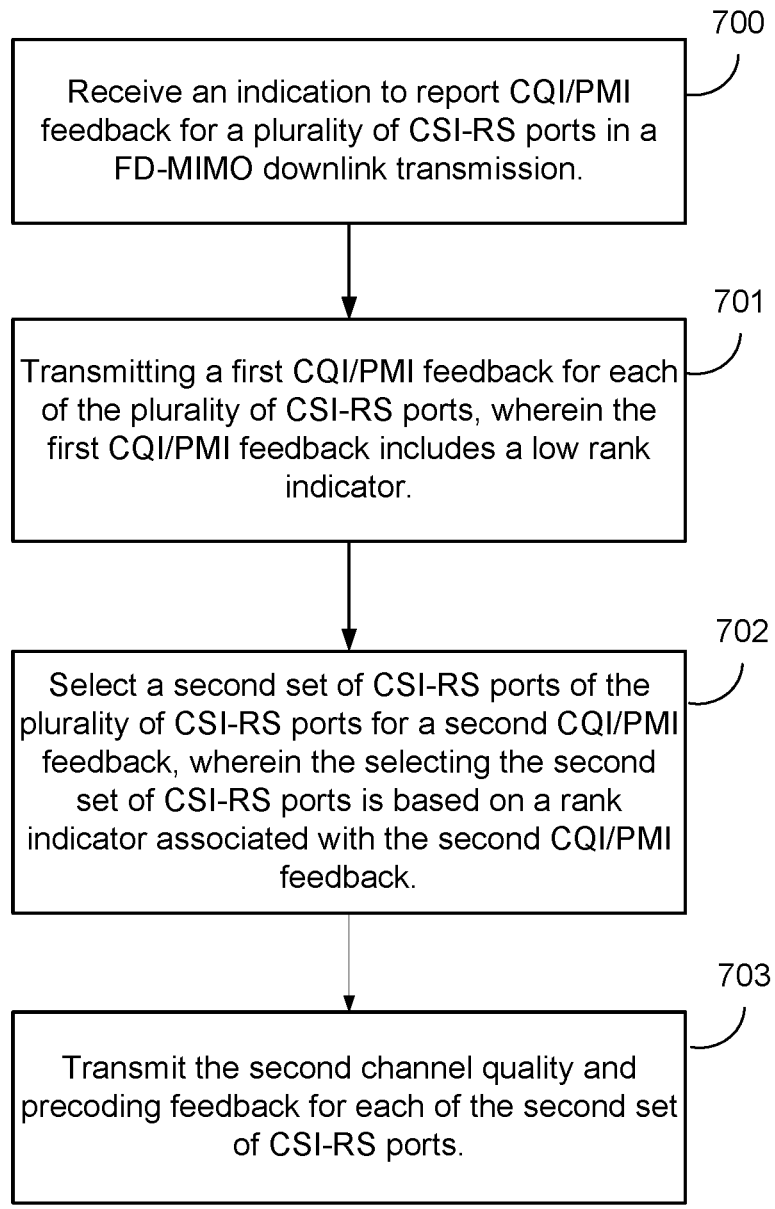
FIG. 7 is a block diagram illustrating example blocks executed to implement one aspect of the present disclosure.
Figure 8:
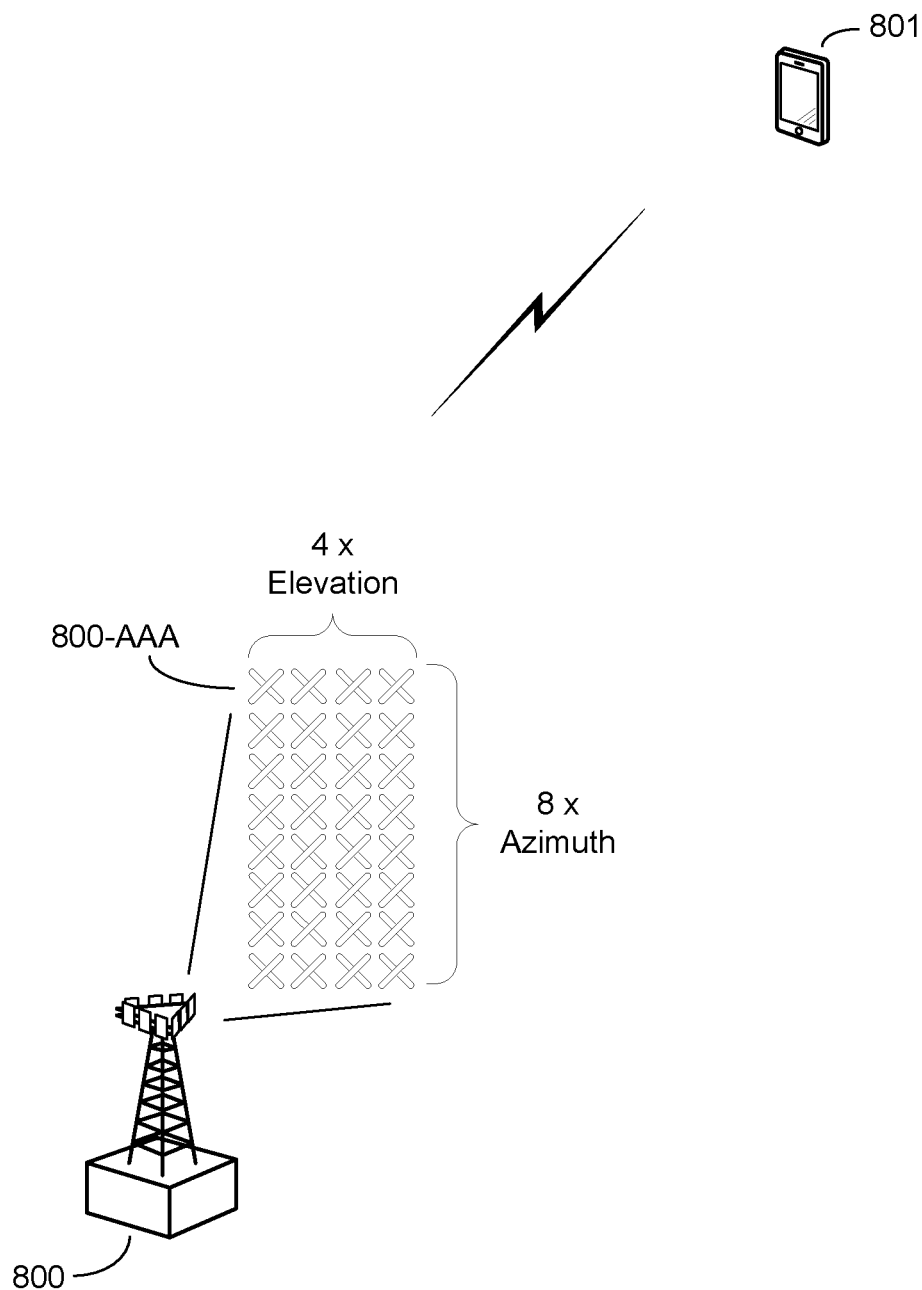
FIG. 8 is a block diagram illustrating a base station and UE configured to reduce CSI feedback in FD-MIMO transmissions according to aspects of the present disclosure.

FIG. 7 is a block diagram illustrating example blocks executed to implement one aspect of the present disclosure. The blocks and features illustrated in FIG. 7 will also be described with respect to the hardware and components illustrated in FIG. 8. FIG. 8 is a block diagram illustrating a base station 800 and UE 801 configured to reduce CSI feedback in FD-MIMO transmissions according to aspects of the present disclosure. Base station 800, which may include components similar to those detailed with regard to base station 110 in FIG. 3, includes a 2D-MIMO active antenna array 800-AAA having four sets of elevation ports and eight sets of azimuth ports. At block 700, a UE, such as UE 801, receives an indication to report CQI/PMI feedback for a plurality of CSI-RS ports in a FD-MIMO downlink transmission from base station 800 using 2D-MIMO active antenna array 800-AAA.

At block 701, UE 801 may select a first set of CSI-RS ports of the plurality of CSI-RS ports of 2D-MIMO active antenna array 800-AAA for a first CQI/PMI feedback, wherein the first CQI/PMI feedback is associated with a low rank indicator. At block 702, UE 801 may select a second set of CSI-RS ports of the plurality of CSI-RS ports for a second CQI/PMI feedback. Accordingly, the described aspect provides for rank-dependent CSI measurement. In example aspects, the selection of the second set of CSI-RS ports is based on a rank indicator associated with the second CQI/PMI feedback.

At block 703, UE 801 may transmit the second CQI/PMI feedback for a second set of CSI-RS ports of 2D-MIMO active antenna array 800-AAA. By considering rank-dependent limitations on the number of CSI-RS ports for CSI feedback, UE 801 effectively reduces the uplink overhead by selecting only a subset of the total number of CSI-RS ports of 2D-MIMO active antenna array 800-AAA for high rank CSI feedback. In various examples of operation, rank 1 feedback may be based on a full set of the plurality of CSI-RS ports and rank 2 and other higher order rank feedback may be based on a part of CSI-RS ports of the plurality of CSI-RS ports. For rank 1, UE 801 would only report PMI for one layer. Thus, with the same feedback overhead, rank 1 could support a larger number of CSI-RS ports than rank 2 or other higher order ranks.

Secondly, rank 1 feedback is typically associated with multiuser operation. Compared with single user MIMO, the elevation beamforming design for multiuser MIMO may provide for higher spatial resolution and finer precoding granularity. Thus, the rank-dependent CSI limitation or management allows for a tradeoff between single user MIMO performance and uplink feedback overhead, which may also help to reduce UE processing complexity.

There are several options which may be utilized by UE 801 to determine which CSI-RS ports of 2D-MIMO active antenna array 800-AAA to designate for higher order single user MIMO. In one option, CSI-RS ports for higher order rank may be considered a subset of the CSI-RS ports in 2D-MIMO active antenna array 800-AAA available for rank 1. For example, the subset of higher order single user MIMO CSI-RS ports of 2D-MIMO active antenna array 800-AAA may be configured via RRC signaling of a bitmap indicator from base station 800.

In a second option, RRC signaling from base station 800 may provide fixed weights to designate virtualized CSI-RS ports. The weights received by UE 801 from base station 800 may be used to generate a virtualization matrix, T. For example, with a full channel matrix, H, and a configured CSI-RS virtualization matrix, T, generated based on the weights received from base station 800, the CSI reporting for higher order ranks may be based on the transformed channel, HT, instead of simply H.

In a third option, the weights for designating the virtualized CSI-RS ports of 2D-MIMO active antenna array 800-AAA may be UE-specific weights determined by UE 801 from rank 1 PMI feedback. For example, a rank 1 PMI may be given by, $W=T_1T_2$, where $T_1$ is a tall matrix of a UE-specific wideband precoding matrix mapping small number of antenna ports to large number of antenna elements, and $T_2$ is the subband precoding matrix for a less dimension antenna ports. In such aspects, the CSI reporting for high order rank may be based on, $HT_1$, instead of simply H.

Currently, for aperiodic CSI reporting, PUSCH mode 3-2 provides for the UE to report both subband CQI and subband PMI. However, due to the increased feedback overhead caused by the large number of antenna ports, this mechanism is difficult to support. One solution according to additional aspects of the present disclosure is to allow UE-selected subband feedback.

Figure 9:
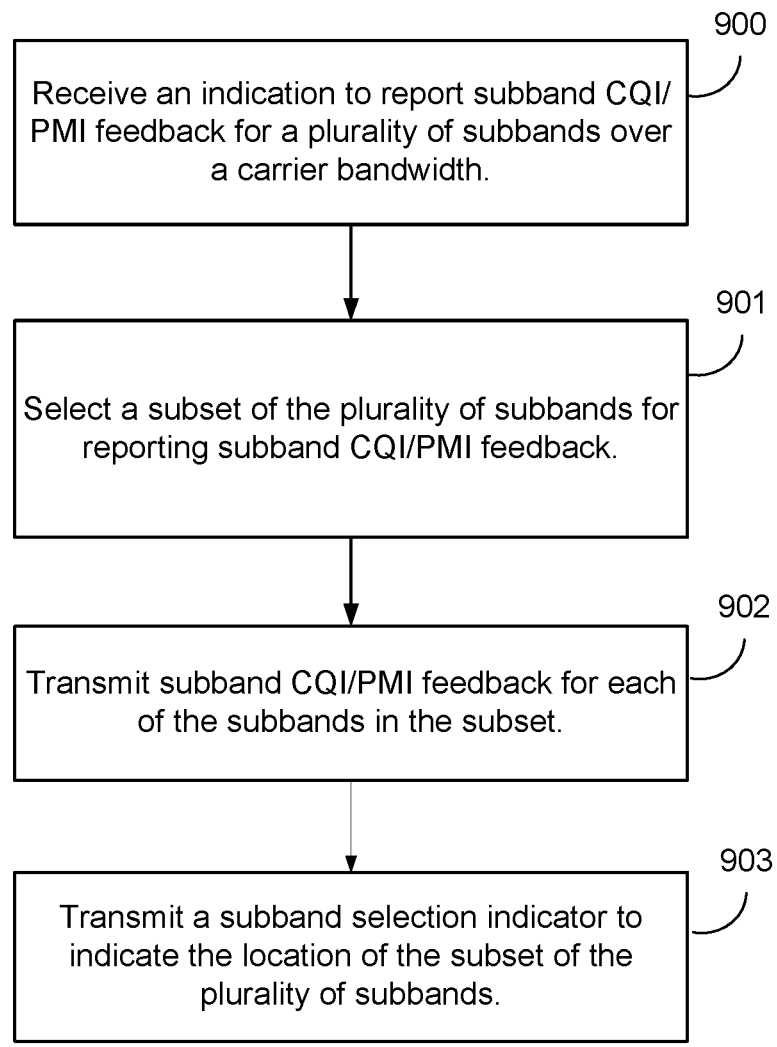
FIG. 9 is a block diagram illustrating example blocks executed to implement one aspect of the present disclosure.
Figure 10A:
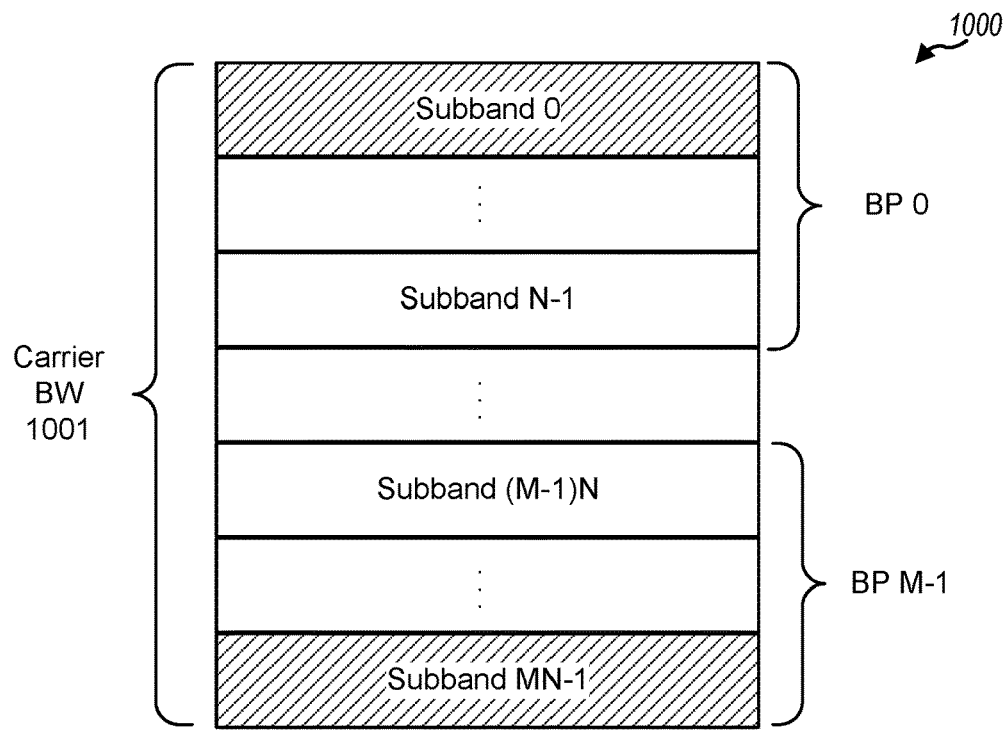
FIGS. 10A and 10B are block diagrams illustrating example subband selection according to aspects of the present disclosure.

FIG. 9 is a block diagram illustrating example blocks executed to implement one aspect of the present disclosure. The blocks and features illustrated in FIG. 9 may also be described with respect to the hardware and components illustrated in FIG. 8. The blocks and features illustrated in FIG. 9 may also be described with respect to the carrier 1000 illustrated in FIG. 10A. FIG. 10A is a block diagram illustrating carrier 1000 reflecting CSI feedback operations by an UE for FD-MIMO configured according to one aspect of the present disclosure. At block 900, a UE, such as UE 801, receives an indication from a serving base station, such as base station 800, to report subband CQI/PMI feedback for a plurality of subbands (e.g., subbands 0-MN−1) over a carrier band width, such as carrier bandwidth 1001.

At block 901, UE 801 selects a subset of the plurality of subbands for reporting subband CQI/PMI feedback. For example, assuming a bandwidth part (BP) is frequency-consecutive and consists of N consecutive subbands, for UE-selected subband feedback, a single subband out of the N consecutive subbands of a bandwidth part may be selected for CSI reporting along with an L-bit label that designates the subband location within the particular bandwidth part. There are a total of M bandwidth parts for a serving cell carrier bandwidth, such as carrier bandwidth 1001.

At block 902, UE 801 transmits the subband CQI/PMI feedback for each of the subbands in the subset. Thus, as illustrated in FIG. 8, a maximum of M subband CQI/PMIs are reported together with M subband L-bit location indicators. For example, instead of providing subband CQI/PMI feedback for each of subbands 0-MN−1, UE 801 selects, within bandwidth part (BP) 0, subband 0 as the best subband for BP 0, subband MN−1 as the best subband for BP M−1, and any other of the indicated best subbands for the bandwidth parts between BP 0 and BP M−1. In addition to this subband CQI/PMI feedback, UE 801 will transmit M L-bit location indicators that indicate the location of subband 0 within BP 0, the location of subband MN−1 within BPM−1, and the like.

It should be noted that the "best" subbands for selection by UE 801 may be determined "best" based on the subband within the bandwidth part that would have the most favorable conditions for downlink transmissions from base station 800. In additional aspects, the determination of "best" subband may be based on additional or separate criteria as well (e.g., highest received signal strength, lowest interference, largest spectrum efficiency, and the like).

At block 903, UE 801 transmits a wideband CQI/PMI feedback determined over the carrier bandwidth, such as carrier bandwidth 1001. In order to provide a reference for the non-selected subbands, UE 801 may also report a wideband CQI/PMI determined across the whole cell carrier bandwidth. Base station 800 may then use both the individually selected subband CQI/PMI feedback and the wideband CQI/PMI feedback for the entire carrier bandwidth 100 as a reference for the non-selected subbands in each bandwidth part.

Figure 10B:
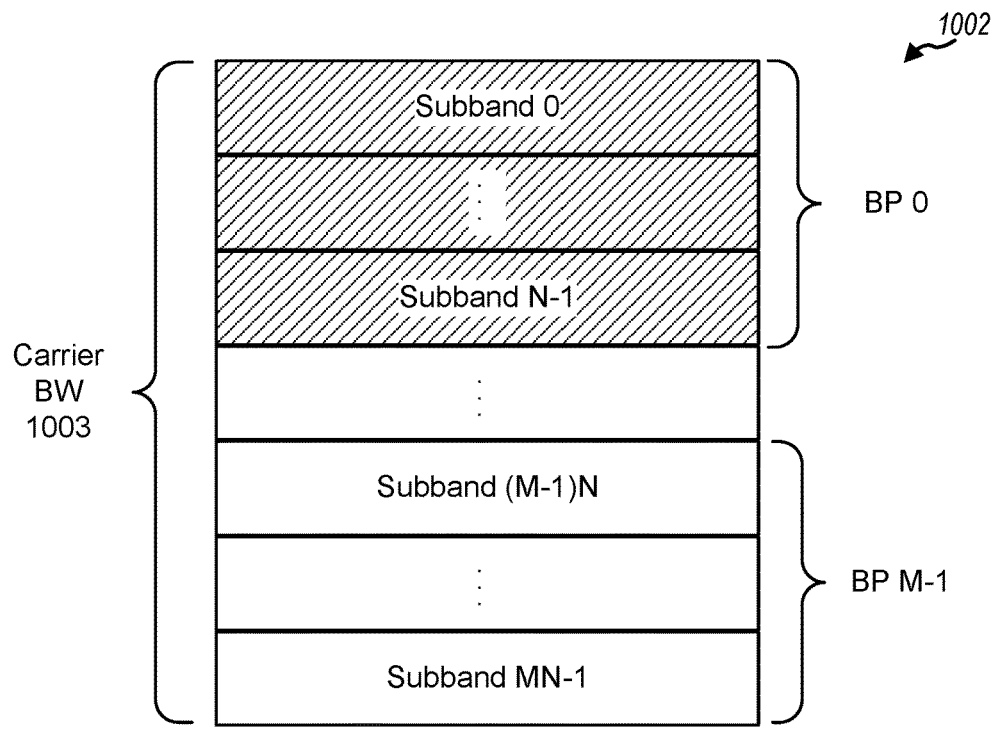

FIG. 10B is a block diagram illustrating a carrier 1002 having subband selection by a UE configured according to one aspect of the present disclosure. As an alternative solution for the distributed UE-selected subband feedback illustrated in FIG. 10A, UE 80 may to select whole bandwidth parts for subband CSI reporting. For example, with regard to carrier 1000, UE 801 may select each of the subbands, subband 0-subband N−1 for subband CSI feedback. UE 801 would generate the subband CQI/PMI feedback for each of subband 0-subband N−1 and report this feedback along with a label index of bandwidth part, BP0.

Figure 11:
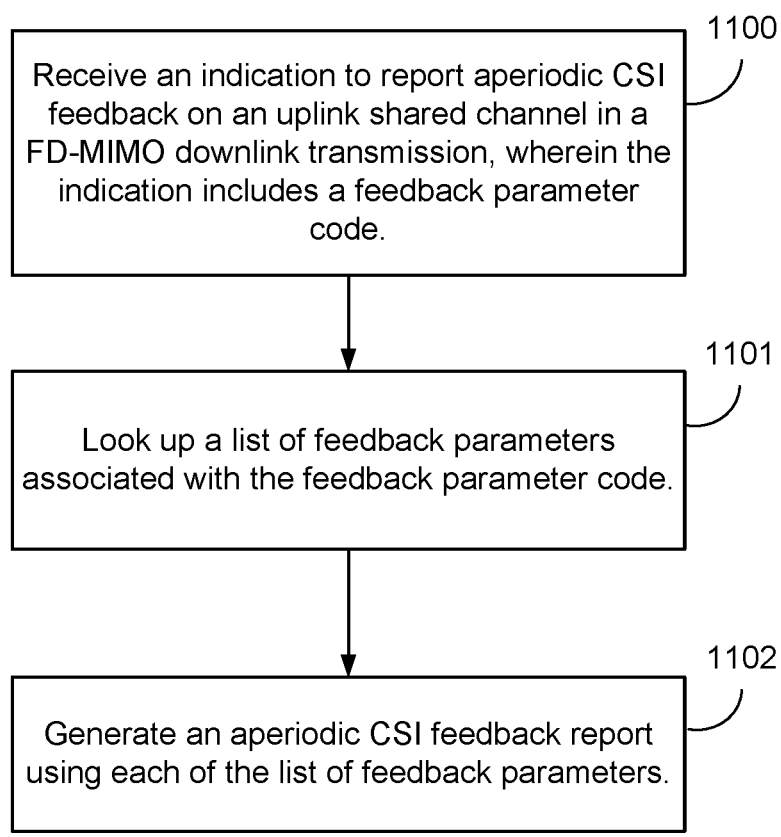
FIG. 11 is a block diagram illustrating example blocks executed to implement one aspect of the present disclosure.
Figure 12:
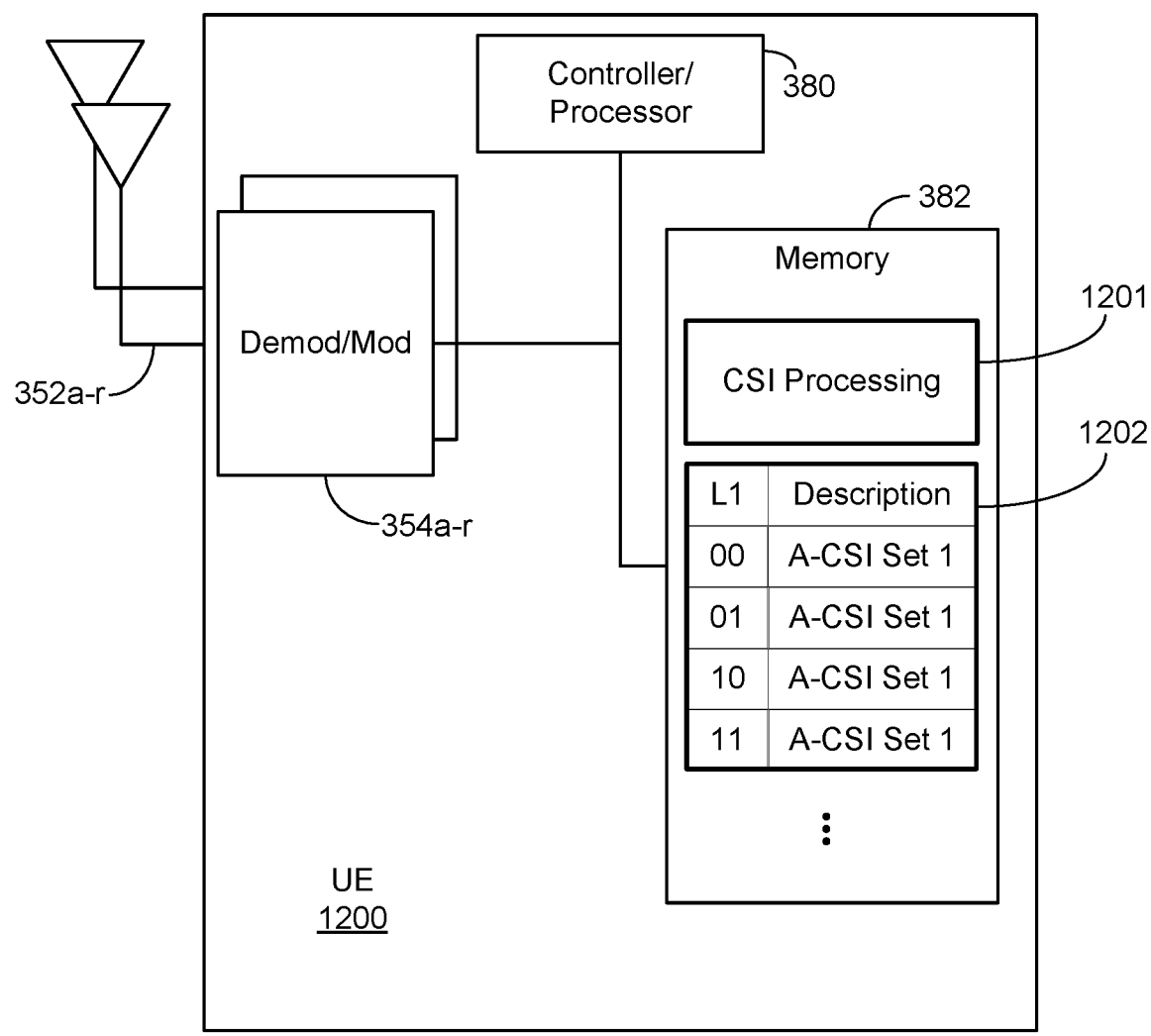
FIG. 12 is a block diagram illustrating a UE configured according to one aspect of the present disclosure.

FIG. 11 is a block diagram illustrating example blocks executed to implement one aspect of the present disclosure. The blocks and features illustrated in FIG. 11 may also be described with respect to UE 1200 illustrated in FIG. 12. FIG. 12 is a block diagram illustrating a UE configured according to one aspect of the present disclosure. At block 1100, a UE, such as UE 1200 may receive an indication to report aperiodic CSI feedback for a plurality of CSI-RS ports in a FD-MIMO downlink transmission, wherein the indication includes a feedback parameter code. For example, UE 1200 receives a control message from a base station (not shown) through antennas 352a-r and demodulated through demodulator/modulators 354a-r, which includes one or more bits of a feedback parameter code.

At block 1101, UE 1200 looks up a list of feedback parameters associated with the feedback parameter code. In operation, UE 1200, under control of controller/processor 380 identifies the feedback parameter code in the control signal and looks to feedback parameter table 1202 stored in memory 382. Using the feedback parameter code, UE 1200 may identify the list of feedback parameters associated with the code.

At block 1102, UE 1200 generates a CSI feedback report using each of the list of feedback parameters. Using the feedback parameters identified in feedback parameter table using the feedback parameter code, UE 1200, under control of controller/processor 380 executes CSI processing 1201 using the specific feedback parameters identified by the code. UE 1200 may then transmit the resulting aperiodic CSI report to the requesting base station.

Thus, the additional aspects of the present disclosure described with respect to FIGS. 11 and 12 provide for on-demand CSI feedback. It may also be preferable to have on-demand CSI feedback with such specific feedback parameters, such as CSI reporting mode, vertical vs. horizontal PMI, or both, and the like, as part of an aperiodic CSI triggering for more flexible aperiodic CSI reporting. In order to reduce L1 signaling for flexible CSI reporting, multiple parameter sets may be predefined, as indicated, with different values for dynamic aperiodic CSI reporting parameters. A few bits added to the DCI uplink grant for the feedback parameter code may be used to indicate which parameter set is used for flexible aperiodic CSI reporting. A UE may then use the parameter sets indicated by higher layer signalling for determining the aperiodic CSI reporting parameters. The on-demand CSI feedback via L1 signaling can provide the best tradeoff between performance and feedback overhead.

The following parameters for determining aperiodic CSI reporting and CSI measurement antenna port may be included in the parameter set:

Aperiodic CQI reporting mode, e.g. subband or wideband CQI/PMI
CQI/PMI beta offset for single and multiple codewords
codebookSubsetRestriction
Bandwidth part indicator
PMI/RI reporting indicator
SU/MU CSI indication
Vertical vs. Horizontal or both CSI indication The configured parameter sets can apply to all the CSI processes or a particular CSI process based on higher layer configuration.

Currently, the network can trigger the aperiodic CSI-only transmission on PUSCH if there is no transport block for the UL-SCH. The following criteria are currently known for determining whether there is only aperiodic CSI feedback for the current PUSCH reporting mode. If DCI format 0 is used or, if DCI format 4 is used and only 1 transport block is enabled, for the enabled transport block and the number of transmission layers is 1, and if the "CSI request" bit field is 1 bit and the bit is set to trigger an aperiodic report and N_PRB<=4 (e.g., for non-CA), Or the "CSI request" bit field is 2 bits and is triggering an aperiodic CSI report for more than one serving cell according to Table 7.2.1–1A and N_PRB<=20 (for CA). Now with 2D feedback for FD-MIMO operations, the above condition of N_PRB<=4 or N_PRB<=20 is modified to N_PRB<=8 or 40, respectively, due to double payload size of H- and V-PMIs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7, 9, and 11 may comprise processors, electronics devices, hardware devices, electronics components, logical circuits, memories, software codes, firmware codes, etc., or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
    receiving, at a user equipment (UE), an indication to report subband channel quality and precoding feedback for a plurality of subbands over a carrier bandwidth;
    selecting, by the UE, a subset of the plurality of subbands for reporting the subband channel quality and precoding feedback;
    transmitting, by the UE, the subband channel quality and precoding feedback for each of the subbands in the subset, wherein the subset includes at least one subband selected from each bandwidth part of a plurality of bandwidth parts comprising the carrier bandwidth; and
    transmitting, by the UE, a subband selection indicator to indicate a location of the subset of the plurality of subbands.

2. The method of claim 1, further including:
    transmitting, by the UE, a wideband channel quality and precoding feedback determined over the carrier bandwidth.

3. The method of claim 1, wherein each bandwidth part of the plurality of bandwidth parts includes a set of consecutive subbands of the plurality of subbands, wherein the selecting the subset of subbands includes:
    selecting a single subband in each of the plurality of bandwidth parts, wherein the single subband selected in each of the plurality of bandwidth parts represents a most favorable subband for the subband channel quality and precoding feedback among each subband of the set of consecutive subbands, the most favorable subband determined based, at least in part, on a largest spectrum efficiency.

4. The method of claim 3, wherein a determination of the most favorable subband for the subband channel quality and precoding feedback among each subband of the set of consecutive subbands is further based on one of: a highest received signal strength or a lowest interference.

5. The method of claim 1, wherein the carrier bandwidth is divided into a plurality of bandwidth parts each of such plurality of bandwidth parts including a set of consecutive subbands of the plurality of subbands, wherein the selecting the subset of subbands includes:
    selecting a bandwidth part of the plurality of bandwidth parts for reporting the subband channel quality and precoding feedback, wherein the subband channel quality and precoding feedback is generated for each subband of the set of consecutive subbands in the selected bandwidth part.

6. The method of claim 5 further comprising:
    transmitting an index indicator related to the selected bandwidth part, wherein the index indicator indicates the location of the selected bandwidth part within the plurality of bandwidth parts.

7. An apparatus configured for wireless communication, the apparatus comprising:
    at least one processor; and
    a memory coupled to the at least one processor,
    wherein the at least one processor is configured to:
        receive an indication to report subband channel quality and precoding feedback for a plurality of subbands over a carrier bandwidth;
        select a subset of the plurality of subbands for reporting the subband channel quality and precoding feedback;
        transmit the subband channel quality and precoding feedback for each of the subbands in the subset, wherein the subset includes at least one subband selected from each bandwidth part of a plurality of bandwidth parts comprising the carrier bandwidth; and
        transmit a subband selection indicator to indicate a location of the subset of the plurality of subbands.

8. The apparatus of claim 7, wherein the at least one processor is further configured to transmit a wideband channel quality and precoding feedback determined over the carrier bandwidth.

9. The apparatus of claim 7, wherein each bandwidth part of the plurality of bandwidth parts includes a set of consecutive subbands of the plurality of subbands, and wherein the at least one processor is configured to select the subset of subbands by selecting a single subband in each of the plurality of bandwidth parts, and wherein the single subband selected in each of the plurality of bandwidth parts represents a most favorable subband for the subband channel quality and precoding feedback among each subband of the set of consecutive subbands.

10. The apparatus of claim 9, wherein a determination of the most favorable subband for the subband channel quality and precoding feedback among each subband of the set of consecutive subbands is based on one of highest received signal strength, lowest interference, or largest spectrum efficiency.

11. The apparatus of claim 7, wherein the carrier bandwidth is divided into a plurality of bandwidth parts each of such plurality of bandwidth parts including a set of consecutive subbands of the plurality of subbands, and wherein the at least one processor is configured to select the subset of subbands by selecting a bandwidth part of the plurality of bandwidth parts for reporting the subband channel quality and precoding feedback, and wherein the subband channel quality and precoding feedback is generated for each subband of the set of consecutive subbands in the selected bandwidth part.

12. The apparatus of claim 11, wherein the at least one processor is further configured to transmit an index indicator of the selected bandwidth part, wherein the index indicator indicates the location of the selected bandwidth part within the plurality of bandwidth parts.

13. A non-transitory computer-readable medium having program code recorded thereon, the program code executable by a computer for causing the computer to:
receive, at a user equipment (UE), an indication to report subband channel quality and precoding feedback for a plurality of subbands over a carrier bandwidth;
select, at the UE, a subset of the plurality of subbands for reporting the subband channel quality and precoding feedback;
transmit, by the UE, the subband channel quality and precoding feedback for each of the subbands in the subset, wherein the subset includes at least one subband selected from each bandwidth part of a plurality of bandwidth parts comprising the carrier bandwidth; and
transmit, by the UE, a subband selection indicator to indicate a location of the subset of the plurality of subbands.

14. The non-transitory computer-readable medium of claim 13, further including program code executable by the computer for causing the computer to transmit a wideband channel quality and precoding feedback determined over the carrier bandwidth.

15. The non-transitory computer-readable medium of claim 13, wherein each bandwidth part of the plurality of bandwidth parts includes a set of consecutive subbands of the plurality of subbands, and wherein the program code executable by the computer for causing the computer to select the subset of subbands includes program code causing the computer to select a single subband in each of the plurality of bandwidth parts, and wherein the single subband selected in each of the plurality of bandwidth parts represents a most favorable subband for the subband channel quality and precoding feedback among each subband of the set of consecutive subbands.

16. The non-transitory computer-readable medium of claim 15, wherein a determination of the most favorable subband for the subband channel quality and precoding feedback among each subband of the set of consecutive subbands is based on one of highest received signal strength, lowest interference, or largest spectrum efficiency.

17. The non-transitory computer-readable medium of claim 13, wherein the carrier bandwidth is divided into a plurality of bandwidth parts each of such plurality of bandwidth parts including a set of consecutive subbands of the plurality of subbands, and wherein the program code executable by the computer for causing the computer to select the subset of subbands includes program code causing the computer to select a bandwidth part of the plurality of bandwidth parts for reporting the subband channel quality and precoding feedback, and wherein the subband channel quality and precoding feedback is generated for each subband of the set of consecutive subbands in the selected bandwidth part.

18. The non-transitory computer-readable medium of claim 17, further including program code executable by the computer for causing the computer to transmit an index indicator of the selected bandwidth part wherein the index indicator indicates the location of the selected bandwidth part within the plurality of bandwidth parts.

\* \* \* \* \*